(12) United States Patent
Tsushima

(10) Patent No.: US 12,137,358 B2
(45) Date of Patent: Nov. 5, 2024

(54) INFORMATION PROCESSING APPARATUS, VEHICLE, COMPUTER READABLE STORAGE MEDIUM AND INFORMATION PROCESSING METHOD

(71) Applicant: HONDA MOTOR CO., LTD., Tokyo (JP)

(72) Inventor: Kosei Tsushima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 17/666,561

(22) Filed: Feb. 8, 2022

(65) Prior Publication Data

US 2022/0322109 A1    Oct. 6, 2022

(30) Foreign Application Priority Data

Mar. 31, 2021   (JP) .................. 2021-061619

(51) Int. Cl.
*H04W 4/00* (2018.01)
*H04L 43/0888* (2022.01)
*H04W 4/40* (2018.01)
*H04W 24/02* (2009.01)
*H04W 24/08* (2009.01)

(52) U.S. Cl.
CPC ......... *H04W 24/02* (2013.01); *H04L 43/0888* (2013.01); *H04W 4/40* (2018.02); *H04W 24/08* (2013.01)

(58) Field of Classification Search
None
See application file for complete search history.

(56) References Cited

U.S. PATENT DOCUMENTS

| 2005/0059407 A1 | 3/2005 | Reed |
| 2008/0075116 A1 | 3/2008 | Holierhoek |
| 2011/0300888 A1 | 12/2011 | Sakumoto |

(Continued)

FOREIGN PATENT DOCUMENTS

| CN | 1864417 A | 11/2006 |
| CN | 101132611 A | 2/2008 |

(Continued)

OTHER PUBLICATIONS

Office Action issued for counterpart Chinese Application 202210077758.X, issued by The State Intellectual Property Office of People's Republic of China on Nov. 22, 2023.

(Continued)

*Primary Examiner* — Abdelillah Elmejjarmi

(57) ABSTRACT

Provided is an information processing apparatus for performing a wireless communication with an external apparatus. The information processing apparatus is configured to measure the communication throughput with the external apparatus, predict the future communication throughput using at least the data of the measured communication throughput, and allocates the usable communication throughput for each service in a communication state based on the predicted communication throughput. When the communication of a first service becomes to be in a non-communication state from a communication state, the processor allocates the usable communication throughput to the first service during a predetermined period after the communication of the first service becomes to be in the non-communication state.

16 Claims, 12 Drawing Sheets

(56) References Cited

U.S. PATENT DOCUMENTS

| | | |
|---|---|---|
| 2011/0317556 A1 | 12/2011 | Hiehata |
| 2013/0297819 A1 | 11/2013 | Mittal |
| 2013/0331069 A1 | 12/2013 | Tsai |
| 2014/0226571 A1 | 8/2014 | Das |
| 2016/0042101 A1 | 2/2016 | Yoshida |

FOREIGN PATENT DOCUMENTS

| | | |
|---|---|---|
| CN | 101577670 A | 11/2009 |
| CN | 104184514 A | 12/2014 |
| CN | 104380810 A | 2/2015 |
| CN | 104396215 A | 3/2015 |
| CN | 105027503 A | 11/2015 |
| JP | 2007208653 A | 8/2007 |
| JP | 2011254377 A | 12/2011 |
| JP | 6337881 B2 | 6/2018 |
| JP | 6390167 B2 | 9/2018 |
| WO | 2021004622 A1 | 1/2021 |

OTHER PUBLICATIONS

Office Action issued for counterpart Chinese Application 202210077758. X, issued by The State Intellectual Property Office of People's Republic of China on Jul. 11, 2023.

NEC Corporation, "Video Feed Technology to Support Security, Rescue, and Disaster Prevention (Adaptive Video Distribution Control Technology)" accessed on Sep. 24, 2020, URL:https://jpn.nec.com/rd/tg/smc/research/adaptive_video_feed_control.html.

Hiroshi Yoshida et al., "Video Feed Technology Supporting Public Safety," NEC Technical Journal, Sep. 2017, vol. 70, No. 1, p. 52-55.

Office Action issued for counterpart Japanese Application No. 2021-061619, transmitted from the Japanese Patent Office on Sep. 10, 2024 (drafted on Sep. 2, 2024).

| CATEGORY | | PROPERTY | | SERVICE CONTENT |
|---|---|---|---|---|
| LOW | NON-CONTROL SYSTEM | LOW | UN-STEADY | WEB BROWSING |
| | | | | NEWS APP, SHORT ARTICLE POSTING APP, SNS APP |
| | | | | GAME |
| | | HIGH | STEADY | FILE DOWNLOAD |
| | | | | VIDEO DISTRIBUTION SERVICE, MUSIC WIRING SERVICE |
| | | | | INTERACTIVE COMMUNICATION |
| HIGH | CONTROL SYSTEM | LOW | UN-STEADY | VEHICLE PROBE DATA |
| | | | | DOWNLOADING OF MAP DATA FOR NAVIGATION SYSTEM, REMOTE CONTROL (OPERATION OF ENGINE, AIR CONDITIONER, SWITCHES, ETC.) |
| | | | | REMOTE CONTROL |
| | | HIGH | STEADY | DOWNLOAD OF MAP DATA (FOR AUTOMATIC OPERATION) |
| | | | | CAMERA DATA, AUDIO DATA (FOR REMOTE OPERATION) |
| | | | | RADAR DATA, LIDAR DATA (FOR AUTOMATIC OPERATION) |

FIG.3

| DESTINATION | PRIORITY | MINIMUM QUALITY | ALLOCATION TIME IN NON-COMMUNICATION STATE | ALLOCATION AMOUNT | ALLOCATION REDUCTION RATE |
|---|---|---|---|---|---|
| xxx.xxx.xxx.xxx | 10 | 2 | 10 | 100% | 0% |
| xxx.xxx.xxx.vvv | 5 | 2 | 8 | 5 FIXED | 10% |
| ○○○.xxxx.com | 1 | 1 | 0 | 0 | 0 |
| ... | ... | ... | ... | | ... |

FIG.4

| IP ADDRESS | COMMUNICATION VOLUME |
|---|---|
| xxx.xxx.xxx.xxx | 10Mb |
| xxx.xxx.xxx.yyy | 20Mb |
| xxx.xxx.xxx.zzz | 5Mb |
| ... | ... |

FIG.5

| URL | IP ADDRESS | |
|---|---|---|
| ○○○.xxxx.com | xxx.xxx.xxx.yyy | ... |
| | xxx.xxx.xxx.zzz | ... |
| ... | ... | ... |
| ... | ... | ... |

*FIG.6*

INFORMATION PROCESSING APPARATUS, VEHICLE, COMPUTER READABLE STORAGE MEDIUM AND INFORMATION PROCESSING METHOD

The contents of the following Japanese patent application(s) are incorporated herein by reference:
NO. 2021-061619 filed on Mar. 31, 2021.

BACKGROUND

1. Technical Field

The present invention relates to an information processing apparatus, a vehicle, a computer readable storage medium and an information processing method.

2. Related Art

Patent Document 1 and Patent Document 2 disclose a technology for predicting, based on time series data of communication throughput, time series data of future communication throughput. Non-Patent Document 1 and Non-Patent Document 2 discloses adaptive control technology for avoiding degradation of video quality, due to excessive compression, to distribute video by controlling a compression rate and the number of frames based on prediction of communication throughput.

Patent Document 1: Japanese Patent No. 6337881
Patent Document 2: Japanese Patent No. 6390167
Non-Patent Document 1: "Video Feed Technology to Support Security, Rescue, and Disaster Prevention (Adaptive Video Distribution Control Technology)", NEC Corporation, [retrieved Sep. 24, 2020, 2020], Internet <URL: https:/jpn.nec.com/rd/NEC.com/rd/.tg/smc/research/adaptive_feedvideo_feed_control.control.html>
Non-Patent Document 2: Hiroshi Yoshida and 3 others, "Video Feed Technology Supporting Public Safety," NEC Technical Journal, 2 NEC Gijutsuho, September 2017, Vol. 70, No. 1, p. 52-55.

BRIEF DESCRIPTION OF THE DRAWINGS

FIG. 3 illustrates a table showing a priority of data communication.

FIG. 4 illustrates one example of a data structure of service information that is stored by an information processing apparatus 200.

FIG. 5 illustrates communication volume information showing communication volume of each IP address acquired by a throughput measuring unit 210.

FIG. 6 illustrates a corresponding relationship between an IP address converted from a URL by a proxy processing unit 280 and the URL.

DESCRIPTION OF EXEMPLARY EMBODIMENTS

Hereinafter, the present invention will be described through embodiments of the invention, but the following embodiments do not limit the invention according to the claims. And all the combinations of the features described in the embodiment(s) are not necessarily essential to means provided by aspects of the invention.

Figure 1:
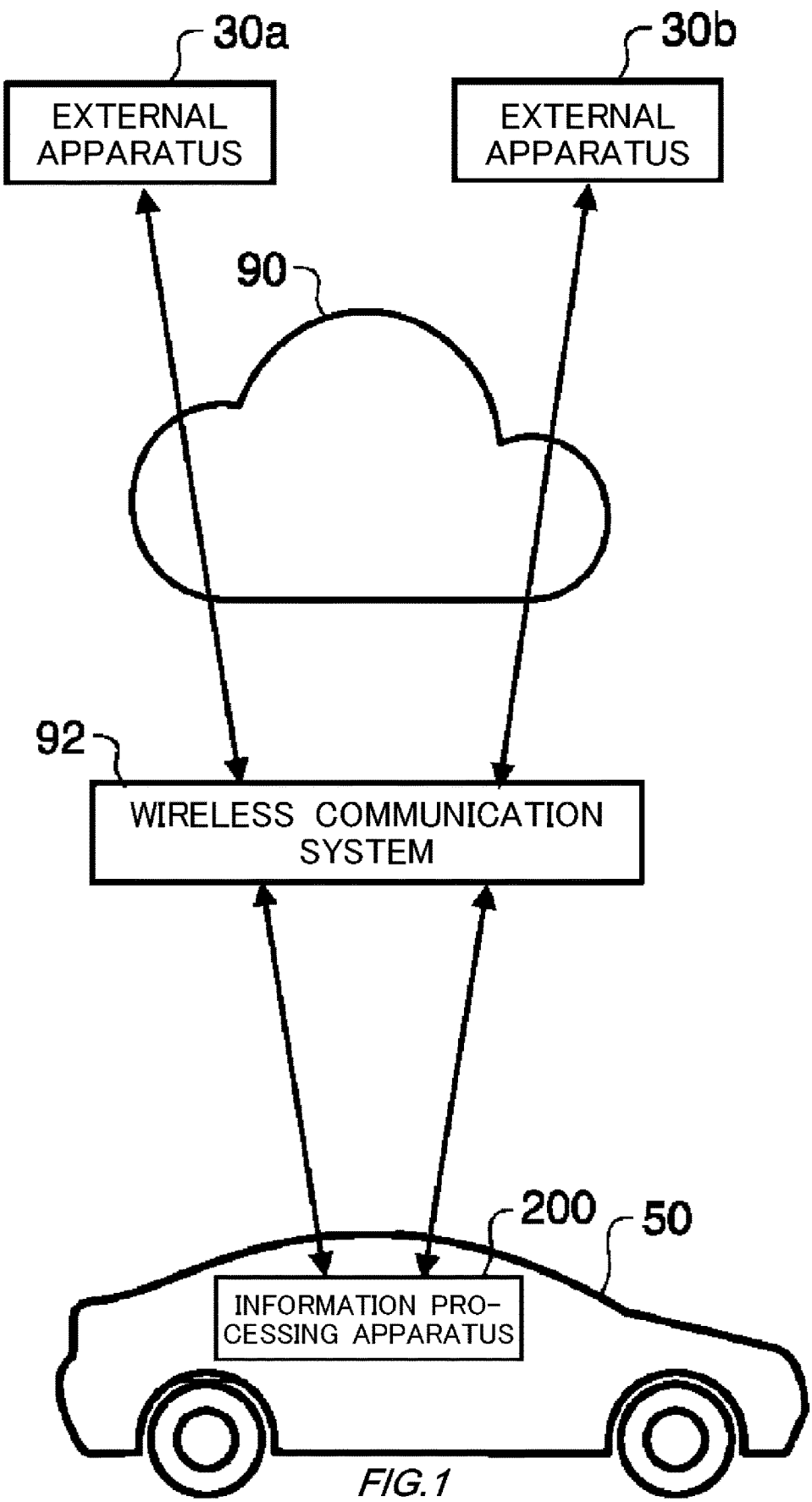
FIG. 1 schematically illustrates a utilization form of a vehicle 50 according to one embodiment.

FIG. 1 schematically illustrates a utilization form of a vehicle 50 according to one embodiment. The vehicle 50 is an automobile, for example. The vehicle 50 may be an automobile equipped with an internal combustion engine, an electric vehicle, a fuel cell vehicle (FCV), or the like. The vehicle 50 is one example of a transportation device.

The vehicle 50 includes an information processing apparatus 200. The information processing apparatus 200 performs a data communication with an external apparatus 30a and an external apparatus 30b. Note that in the present embodiment, the external apparatus 30a and the external apparatus 30b may be collectively referred to as an "external apparatus 30".

The information processing apparatus 200 communicates with the external apparatus 30 through a communication network 90 and a wireless communication system 92. The communication network 90 includes an IP network such as the Internet, a P2P network, a dedicated line including a VPN, a virtual network, and the like. In the present embodiment, the wireless communication system 92 is a mobile object communication network connected to the communication network 90. For example, the wireless communication system 92 includes a wireless access network and a core network.

The external apparatus 30a includes, for example, a server that provides a service to an occupant of the vehicle 50. For example, the external apparatus 30a includes a server for storing content data such as a video, a server for providing an SNS (social networking service), or the like. The information processing apparatus 200 receives video data from the external apparatus 30a in response to an instruction from the occupant of the vehicle 50. Further, the information processing apparatus 200 receives text information, voice information, image information, video information, or the like, as an SNS message, from the external apparatus 30a in response to the instruction from the occupant of the vehicle 50. Further, the information processing apparatus 200 transmits text information, voice information, image information, video information, or the like, as an SNS message from the occupant of the vehicle 50, to the external apparatus 30a in response to the instruction from the occupant of the vehicle 50.

The external apparatus 30b is a server that performs to provide service related to the control system of the vehicle 50, for example. The external apparatus 30b may include, for example, a server that collects control-system-related information for the vehicle 50. The control-system-related information collected by the external apparatus 30 can illustrate LIDAR data or the like used for automated driving of the vehicle 50. The external apparatus 30b may include, for example, a server that provides the control-systemrelated information to the vehicle 50. An example of the control-system-related information provided by the external apparatus 30b may include map data or the like used for the automated driving of the vehicle 50. The information processing apparatus 200 transmits, to the external apparatus 30b, the LIDAR data or the like acquired for automated driving control. The information processing apparatus 200 receives the map data from the external apparatus 30b regardless of the instruction from the occupant of the vehicle 50.

The information processing apparatus 200 measures the current communication throughput, and predicts the future communication throughput based on the measured communication throughput. The information processing apparatus 200 allocates the communication throughput to each service based on the predicted future communication throughput. In this case, when the service in a communication state is transitioned from a communication state to a non-communication state, the information processing apparatus 200 holds the allocation of the communication throughput to the service only in a predetermined period, and releases the allocation of the communication throughput when the predetermined period is expired. In this way, since the allocation of the communication throughput is not deleted only by temporarily suspending the communication, the communication can be resumed rapidly.

Figure 2:
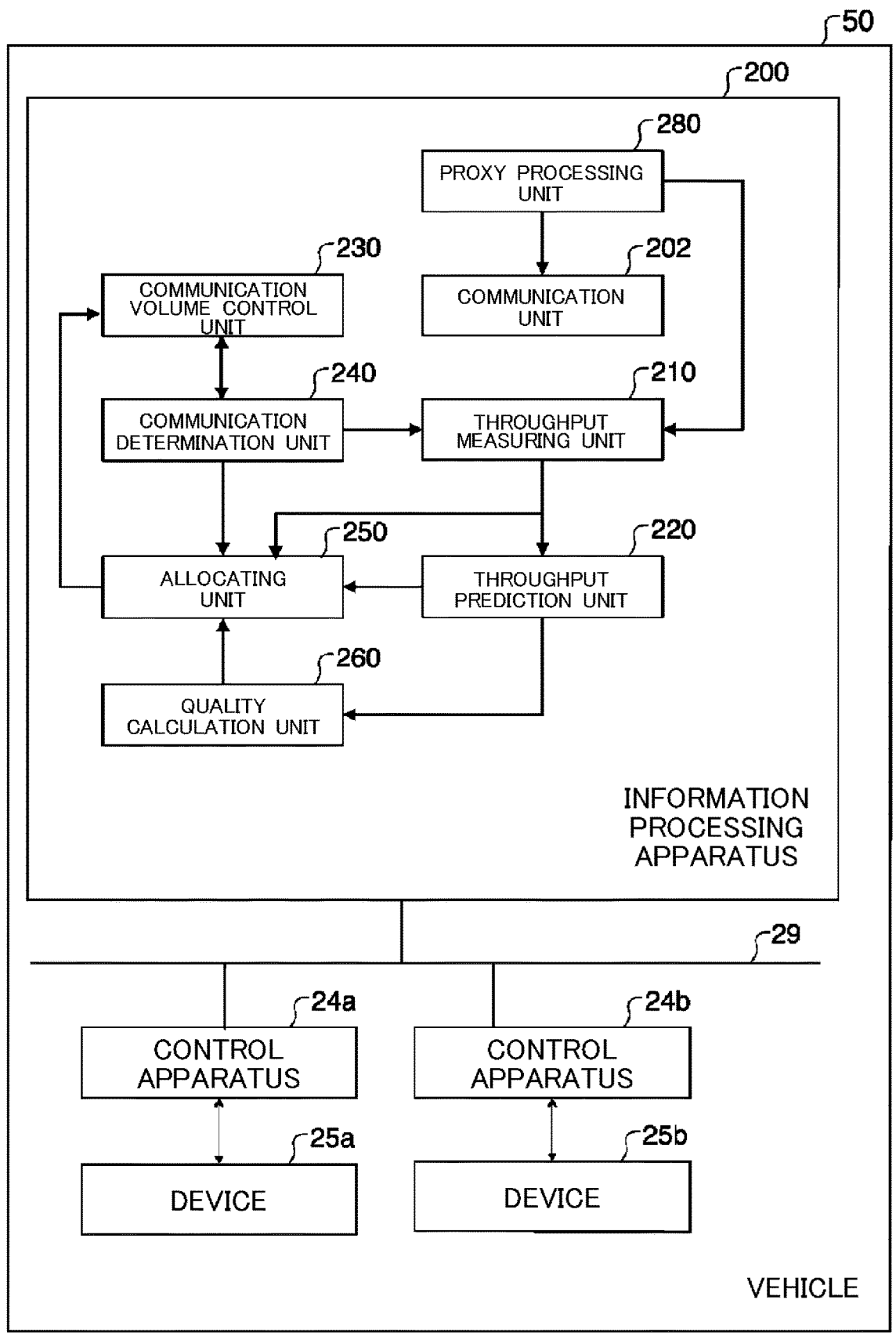
FIG. 2 schematically illustrates a functional configuration of the vehicle 50.

FIG. 2 schematically illustrates a functional configuration of the vehicle 50. The vehicle 50 includes an information processing apparatus 200, a control apparatus 24a, a control apparatus 24b, a device 25a, a device 25b and an in-vehicle network 29. The information processing apparatus 200 includes a communication unit 202, a communication control unit 230, a throughput measuring unit 210, a throughput prediction unit 220, a communication determination unit 240, an allocating unit 250, a quality calculation unit 260 and a proxy processing unit 280. It should be noted that in FIG. 2, a functional block related to the present embodiment is shown. The vehicle 50 and the information processing apparatus 200 may include a functional block other than the functional block shown in FIG. 2.

The information processing apparatus 200, the control apparatus 24a and the control apparatus 24b are connected to each other by the in-vehicle network 29. The in-vehicle network 29 may include a communication network in compliance with the Ethernet (registered trademark). The in-vehicle network 29 may include a Controller Area Network (CAN) communication network.

The control apparatus 24a and the control apparatus 24b control the device 25a and the device 25b, respectively. Each of the control apparatus 24a and the control apparatus 24b may be an Electronic Control Unit (ECU). The device 25a and the device 25b include, for example, a drive system device such as an engine, an information communication system device, or the like. An example embodiment of the control apparatus 24 and the device 25 is described with a specific example related to FIG. 9 and so on. Note that the control apparatus 24a and the control apparatus 24b may be collectively referred to as a "control apparatus 24". Further, the device 25a and the device 25b may be collectively referred to as a "device 25".

The communication unit 202 performs communication with the external apparatus 30 via the mobile object communication network. The communication unit 202 transmits the transmission data with the destination designated by IP address to the IP address as the destination. The proxy processing unit 280 converts the destination of the transmission data with the URL designated as the destination to an IP address, and cause the communication unit 202 to perform transmission. The throughput measuring unit 210 measures the communication throughput with the external apparatus 30. For example, the throughput measuring unit 210 acquires the volume of the communication performed through the communication unit 202 for each IP address. Also, the throughput measuring unit 210 acquires the corresponding relationship between the URL that is converted by the proxy processing unit 280 and the IP address from the proxy processing unit 280, and acquires, as the communication volume of each service, the communication volume obtained by aggregating the communication volume of each IP address for each URL, for the data communication with the corresponding relationship between the URL and the IP address based on the communication volume of each IP address and the corresponding relationship. Also, for the communication volume of the data communication with no corresponding relationship between the URL and the IP address, the throughput measuring unit 210 acquires the communication volume acquired for each IP address as the communication volume of each service. The throughput measuring unit 210 may calculate the communication volume of each service per unit time as the communication throughput of each service. The throughput prediction unit 220 predicts the future communication throughput using at least the data of the communication throughput measured by the throughput measuring unit 210. The allocating unit 250 allocates the usable communication throughput for each service in a communication state, based on the communication throughput predicted by the throughput prediction unit 220. When the communication of a first service becomes in a non-communication state from a communication state, the allocating unit 250 allocates the usable communication throughput to the first service during a predetermined period after the communication of the first service becomes in the non-communication state.

When the communication of a first service becomes in a non-communication state from a communication state, the allocating unit 250 may hold the allocation of the communication throughput that has been allocated when the first service was in the communication state during a predetermined period after the communication of the first service becomes in the non-communication state. When the communication of a second service, whose type is different from the first service, becomes in a non-communication state from a communication state, the allocating unit 250 may allocate a communication throughput lower than the communication throughput that has been allocated when the second service was in the communication state during a predetermined period after the communication of the second service becomes in the non-communication state.

When the communication of a first service becomes in a non-communication state from a communication state, the allocating unit 250 may allocate a predetermined first communication throughput during a predetermined period after the communication of the first service becomes in the non-communication state. When the communication of a second service, whose type is different from the first service, becomes in a non-communication state from a communication state, the allocating unit 250 may allocate a second communication throughput lower than the communication throughput during a predetermined period after the communication of the second service becomes in the non-communication state.

When the communication of a first service becomes in a non-communication state from a communication state, the allocating unit 250 may allocate the usable communication throughput to the first service during a first predetermined period after the communication of the first service becomes in the non-communication state. When the communication of a second service, whose type is different from the first service, becomes in a non-communication state from a communication state, the allocating unit 250 may allocate a usable communication throughput to the first service during a predetermined second period, which is shorter than the first period, after the communication of the second service becomes in the non-communication state.

The first service may include a service related to the control of the vehicle 50. The first service may be at least one of a service regarding web browsing and a service related to a multimedia.

When the communication of a first service becomes in a non-communication state from a communication state, the allocating unit 250 may decrease the usable communication throughput allocated to the first service according to the elapse of time after the communication of the first service becomes in the non-communication state.

The communication determination unit 240 determines the type of the data communication with the external apparatus. The throughput measuring unit 210 measures the communication throughput with the external apparatus for each type. The throughput prediction unit 220 predicts the future communication throughput for each type using at least the data of the communication throughput measured for each type by the throughput measuring unit 210. The allocating unit 250 may set the priority of the communication for a plurality of data communications based on the type determined by the communication determination unit 240. When the future communication throughput falls below a predetermined threshold value, the communication control unit 230 may, for the data communication with a low priority set by the allocating unit 250, compare the communication throughput with the data communication with a high priority set by the allocating unit 250 and limit the communication throughput.

The communication determination unit 240 may determine whether the type of the data communication is a data communication related to the control of the vehicle 50. The allocating unit 250 may set the priority of a predetermined data communication related to the control of the vehicle 50 to be higher than the priority of other data communication. The communication determination unit 240 may determine whether the type of the data communication is a data communication related to the control of the vehicle 50 or a data communication of a multimedia. The allocating unit 250 may set the priority of the data communication related to the control of the vehicle 50 to be higher than the priority of the data communication of a multimedia.

The communication control unit 230 may limit the communication throughput of the data communication with a low priority, up to a predetermined value required to continuously provide the service based on the data communication with a low priority. This makes it possible to decrease a possibility of the data communication being completely disconnected even for the data communication with a low priority.

The communication determination unit 240 may determine whether the type of the data communication is a data communication related to the control of the vehicle 50. The communication control unit 230 may stop another predetermined data communication, when it is not possible to ensure, as the communication throughput of the data communication which relates to the control system of the vehicle 50, a predetermined value required to continuously provide the service based on the data communication which relates to the control system of the vehicle 50.

The quality calculation unit 260 calculates a quality of the data communication based on the communication throughput predicted by the throughput prediction unit 220. The allocating unit 250 may set the priority of the communicate for a plurality of data communications based on the quality of the data communication of each service determined by the communication determination unit 240. For example, the quality calculation unit 260 may calculate a multimedia quality (an MMq) (for example, the MMq as defined in ITU-T Recommendation G.1070). The allocating unit 250 may set the priority of the data communication for each service based on the type and the multimedia quality determined by the communication determination unit 240. Note that the quality calculation unit 260 may calculate any index indicating a quality of service, other than the multimedia quality, as the quality of the data communication.

FIG. 3 illustrates a table showing the priority of data communications. In the table of FIG. 3, a "category" indicates whether the data communication relates to the control system or a non-control system of the vehicle 50. The "property" indicates whether the data communication is steady or unsteady. The "service content" indicates the service content provided by the data communication. As shown in FIG. 3, the data communication which relates to the service for the control system of the vehicle 50 has a higher priority than that of the data communication which relates to the service for the non-control system. Further, the steady data communication has a higher priority than that of the unsteady data communication.

FIG. 4 illustrates one example of a data structure of the service information stored by the information processing apparatus 200. The service information is information that associates the communication destination, the priority, the minimum quality, the allocation time of a non-communication state, the allotment and the allocation reduction rate. The "communication destination" indicates an IP address or a URL of the external apparatus 30 that is the communication destination. It should be noted that the data communication with the external apparatus 30 stored in the "communication destination" indicates the communication throughput to be controlled.

The "priority" indicates the priority of the data communication allocated to the service. It should be noted that in the present embodiment, it is preset that what service the external apparatus 30 provides. Accordingly, the service and the priority are determined for each external apparatus 30. It should be noted that the "service" of the present embodiment is one example of the type of the data communication.

The "minimum quality" indicates the lowest quality of service required to hold the service provided by the data communication. For example, MMq can be used as an indicator of the minimum quality.

The "allocation time of a non-communication state" indicates the number of seconds of the allocation of the communication throughput when the communication state is transitioned to the non-communication state. It should be noted that "0" of the allocation time of a non-communication state indicates the service with no allocation of the communication throughput when the communication state is transitioned to the non-communication state. The "allotment" indicates the magnitude of the allocated communication throughput. The allotment "5 fixed" indicates that the communication throughput of "5 Mbps" is allocated. The "100%" of the allotment indicates that the communication throughput when being in a communication state is allocated. The "allocation reduction rate" indicates the reduction rate for reducing the allocated communication throughput with the elapse of time. The allocating unit 250 allocates the communication throughput for each service that has been in a non-communication state with reference to the "allocation time of a non-communication state", the "allotment" and the "allocation reduction" included in the service information. This enables the setting the "allocation time of a non-communication state", "allotment" and "allocation reduction" for each service according to the service information. Therefore, it is possible to set the length of the allocation time of a non-communication state, the magnitude of the allocated communication throughput, or whether to decrease the allocation of the communication throughput for each service or not.

FIG. 5 illustrates the communication volume information showing the communication volume of each IP address measured by the throughput measuring unit 210. The throughput measuring unit 210 measures the communication volume for each IP address to measure the throughput for each IP address. The "IP address" is an IP address of the communication destination. The "communication volume" is a communication volume per hour. The throughput measuring unit 210 may acquire the information of a TCP packet or UDP packet input to the communication unit 202 by monitoring, by the function provided by the operating system installed in the information processing apparatus 100.

FIG. 6 illustrates the corresponding relationship between the IP address converted from the URL by the proxy processing unit 280 and the URL. When the URL is converted to the IP address, the proxy processing unit 280 holds information indicating the corresponding relationship between the URL and the converted IP address. In the example of FIG. 6, the case is shown, where when the "ooo.xxxx.com" has been designated as a communication destination, the IP address "xxx.xxx.xxx.yyy" is acquired by DNS, and when the same "ooo.xxxx.com" has been designated as the communication destination at another timing, the IP address "xxx.xxx.xxx.zzz" is acquired by DNS.

Figure 7:
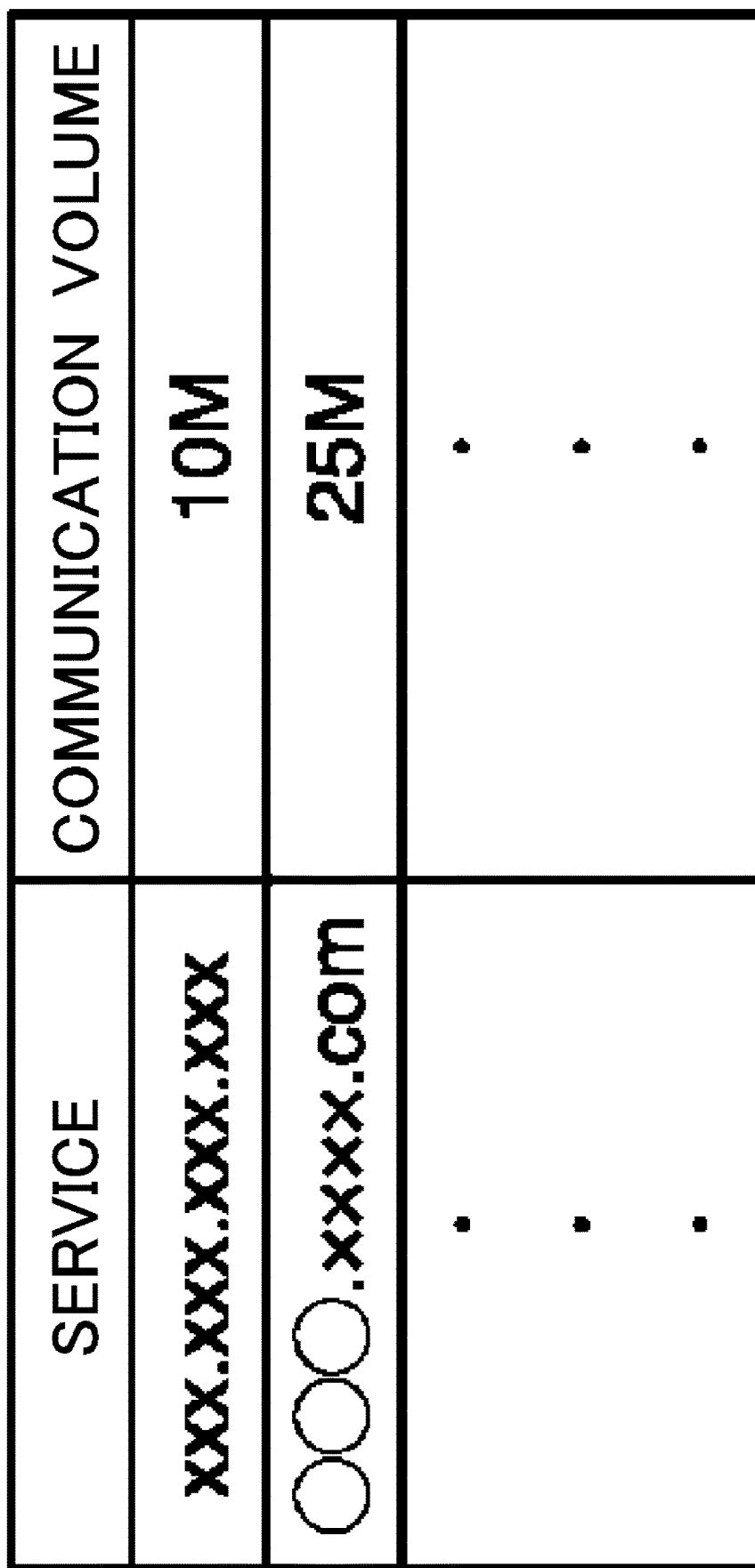
FIG. 7 illustrates a communication volume of each service acquired by the throughput measuring unit 210.

FIG. 7 illustrates the communication volume of each service acquired by the throughput measuring unit 210. The throughput measuring unit 210 acquires the IP address corresponding to the URL "ooo.xxxx.com", based on the corresponding relationship acquired by the proxy processing unit 280. Then, the throughput measuring unit 210 aggregates the communication volume for each URL by summing the communication volume corresponding to the acquired IP address, with reference to the communication volume information shown in FIG. 5. In this way, the communication volume corresponding to "ooo.xxxx.com" is calculated.

Also, the throughput measuring unit 210 identifies the IP address "xxx.xxx.xxx.xxx" that is not corresponding to the URL according to the corresponding relationship acquired by the proxy processing unit 280 among the IP addresses in the communication volume information, and acquires the communication volume corresponding to the identified IP address "xxx.xxx.xxx.xxx". In this way, as shown in FIG. 7, the communication volume for each service is acquired. The throughput measuring unit 210 measures the throughput for each service by calculating the communication volume per unit time based on the communication volume of each acquired service.

Figure 8:
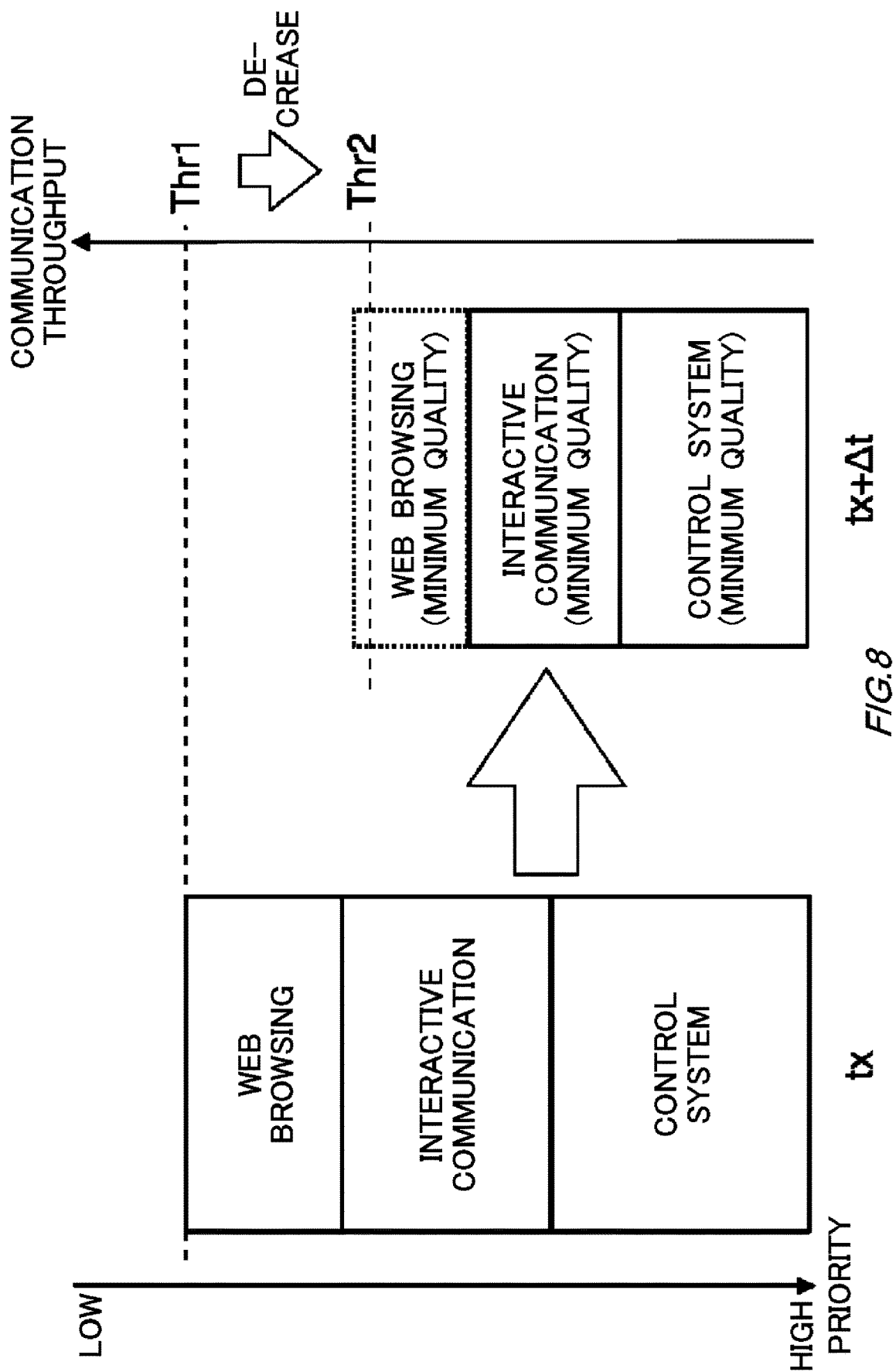
FIG. 8 conceptually illustrates a control of a communication throughput performed based on a priority by a communication control unit 230.

FIG. 8 conceptually illustrates the control of the communication throughput performed by the communication control unit 230 based on the priority. Herein, the control for a case is described where a sudden decrease in the overall communication throughput is predicted.

At time tx, it is assumed that the data communications of the service of the control system of the vehicle 50, the service of interactive communication and the service of web browsing have been performed. Herein, the data communication for the service of the control system has a priority higher than that of the data communications of the service of a non-control system (the interactive communication and web browsing). Also, among the data communications of the service of a non-control system, the data communication for the service of the interactive communication has a higher priority than the data communication for the service of the web browsing.

The total value of the communication throughput at time tx is Thr1. It is assumed that a sudden decrease to Thr2 of the communication throughput after Δt from time tx has been predicted by the throughput prediction unit 220. When it is determined that the total value of the communication throughput required to provide a minimum quality of service, which is respectively required for the data communication for each service performed currently, is higher than Thr2, then the communication control unit 230 controls the throughput of the data communication for the service of the control system and the data communication for the service of the interactive communication to be a communication throughput value that can ensure the respective minimum quality of service. Also, the communication control unit 230 temporarily stops the data communication for the service of web browsing. In this way, while holding the data communication for the service of the control system of the vehicle 50, the overall communication throughput can be controlled to not exceed the predicted throughput.

Figure 9:
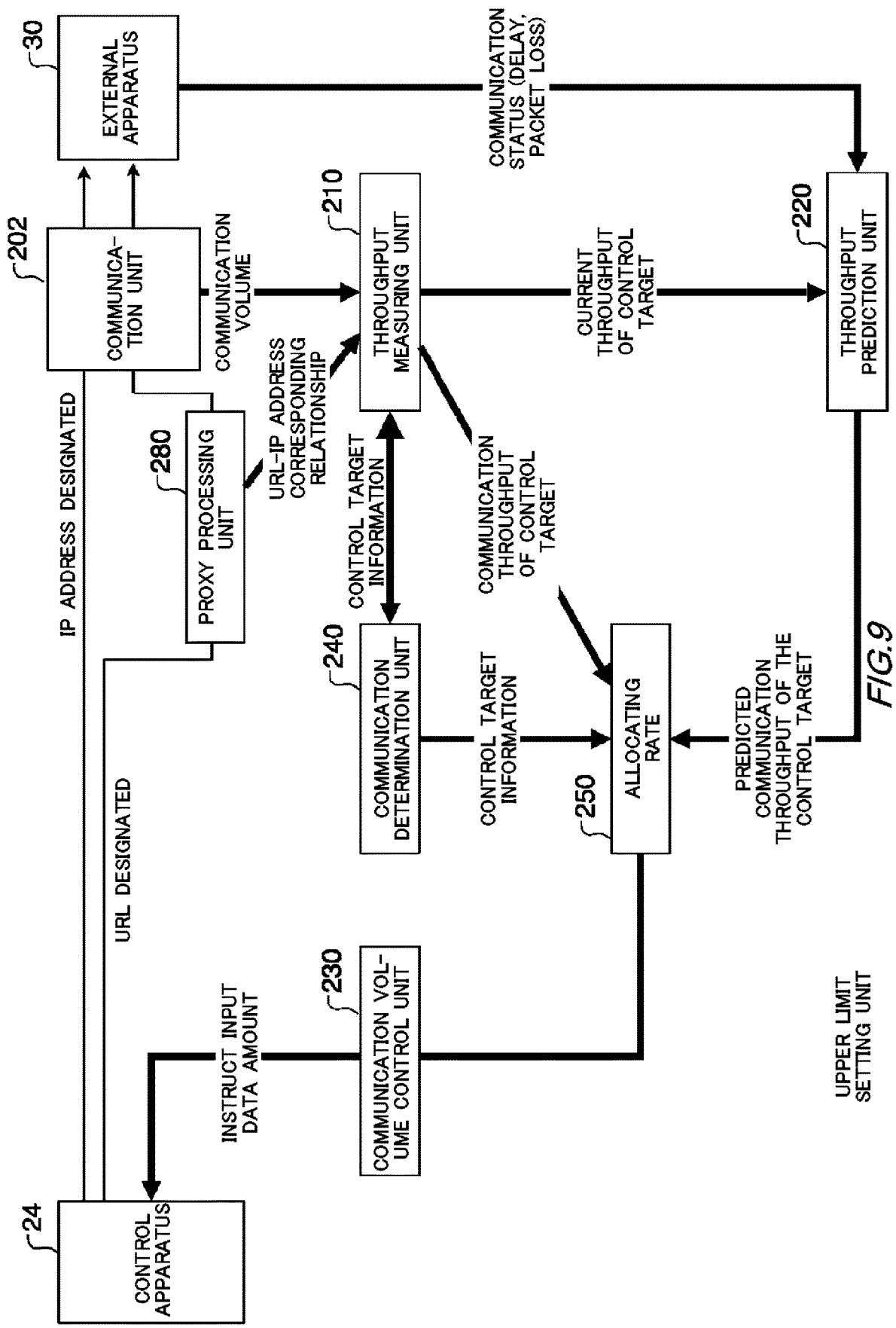
FIG. 9 schematically illustrates a flow of data between functional blocks of the information processing apparatus 200.

FIG. 9 schematically illustrates a flow of the data between functional blocks of the information processing apparatus 200. The control apparatus 24 designates the IP address or the URL of the communication destination and performs the communication. For the communication with the IP address designated, the data are transmitted to the external apparatus 30 through the communication unit 202. For the data communication with the URL designated, the proxy processing unit 280 accepts the processing and the URL is converted into the IP address by the proxy processing unit 280 and transmitted to the external apparatus 30 through the communication unit 202. The proxy processing unit 280 holds the corresponding relationship between the URL and the IP address to which the URL is converted.

The throughput measuring unit 210 acquires the communication volume of the data communication performed through the communication unit 202. For example, the throughput measuring unit 210 monitors the information of the TCP or UDP packet input to the communication unit 202 during a predetermined period and acquires the communication volume for each IP address of the destination of the communication performed through the communication unit 202, using the function included in the operating system. For the communication with the URL designated, the throughput measuring unit 210 acquires the communication volume of each URL obtained by aggregating the communication volume for each URL, as the communication volume of each service, based on the corresponding relationship, acquire from the proxy processing unit 280, between the URL and the IP address to which the URL is converted to, and the volume of the communication performed through the communication unit 202 for each IP address. On the other hand, for the communication with no URL designated as a destination, the throughput measuring unit 210 acquires the communication volume acquired for each IP address as the communication volume of each service.

The communication determination unit 240 acquires the identification information of the service performed by the data communication from the throughput measuring unit 210. The identification information of the service is the list information of the IP addresses and URLs from which the communication volume has been acquired by the throughput measuring unit 210. The communication determination unit 240 determines the service to be controlled of the communication throughput based on the identification information of the service acquired from the throughput measuring unit 210 and the information of the "communication destination" of the service information shown in FIG. 4. The communication determination unit 240 informs the allocating unit 250 and the throughput measuring unit 210 of the identification information of the service to be controlled. The throughput measuring unit 210 calculates the current communication throughput of the data communication of the service to be controlled informed by the communication determination unit 240 for each service to be controlled, based on the communication volume of each acquired service, and informs the throughput prediction unit 220 and the allocating unit 250.

The throughput prediction unit 220 predicts the future communication throughput based on the current communication throughput informed by the throughput measuring unit 210. For example, the throughput prediction unit 220 identifies a prediction model of the time series data based on the time series data of the communication throughput. The prediction model to be identified may be any model as long as the model can predict future time series data from past time series data. For example, the prediction model to be identified can be exemplified by a time series model such as an AR model (AutoRegressive Model), a stochastic differential equation model such as a Vasicek model, or the like. As an example, when the Vasicek model is used, a model parameter of a general solution of the stochastic differential equation of the Vasicek model may be identified by using the general solution of the stochastic differential equation of the Vasicek model and the time series data are used, and using a method, such as a maximum likelihood estimation method. The throughput prediction unit 220 calculates a probability distribution of the time series data of the future communication throughput based on the identified prediction model. The throughput prediction unit 220 may predict the future communication throughput based on the probability distribution of the time series data of the future communication throughput. Note that the throughput prediction unit 220 may calculate the probability distribution of the time series data of the future communication throughput by using methods disclosed in Patent Document 1 and Patent Document 2. As described in Patent Document 1 and Patent Document 2, by using a correction factor calculated based on a communication model obtained by modeling a transient characteristic of a communication protocol of the TCP communication or the like after the start of the communication, and by correcting the time series data to eliminate an influence of the transient characteristic, and based on the corrected time series data, the prediction model of the time series data may be identified.

The throughput prediction unit 220 may predict the communication throughput based on a communication state fed back from the external apparatus 30. The communication state fed back from the external apparatus 30 can be exemplified by a network transfer delay, a packet loss rate, and the like. The throughput prediction unit 220 predicts the future communication throughput for each service to be controlled of the communication throughput. Also, the throughput prediction unit 220 predicts the total communication throughput of the service to be controlled of the communication throughput. The throughput prediction unit 220 informs the allocating unit 250 of the predicted future communication throughput.

The allocating unit 250 is responsible for the process of allocating the communication throughput to each service. The allocating unit 250 allocates the communication throughput to each service according to the priority of the service. For example, when the predicted future total communication throughput falls below a predetermined threshold value, the allocating unit 250 sets the priority of the data communication for each service based on the "priority" of the service information shown in FIG. 4, and determines the allocation of the communication throughput for each service based on the set priority. The allocating unit 250 may determine the allocation of the communication throughput for each service to be controlled according to the priority set for each service, based on the identification information of the service to be controlled informed by the communication determination unit 240 and the predicted communication throughput of each service informed by the throughput prediction unit 220. The allocating unit 250 may inform the communication volume control unit 230 of the information indicating the determined communication throughput of each service.

It should be noted that when setting the communication throughput for each service based on the priority, the quality calculation unit 260 may calculate the index value of the quality of service based on the future communication throughput. The index value of the communication quality may be MMq. The allocating unit 250 may calculate the communication throughput based on the quality of service calculated by the quality calculation unit 260. For example, the allocating unit 250 may select, as the upper limit value, a communication throughput corresponding to the index value below the communication quality calculated by the quality calculation unit 260, with reference to the information corresponding to the predetermined index value of the communication quality and the communication throughput. The allocating unit 250 may set the communication throughput corresponding to the quality of service that is equal to or higher than the minimum quality for the data communication of the service with a priority higher than the predetermined value, and at the same time, may set the communication throughput corresponding to the minimum quality of service for the data communication of the service with a priority lower than the predetermined value, to adapt to the future communication throughput.

When a service has become to be in a non-communication state from the communication state, the allocating unit 250 allocates the communication throughput to the service that has become to be in a non-communication state from a communication state with reference to the "allocation time of a non-communication state" and the "allotment" and the "allocation reduction rate" of the service information during the predetermined period, based on the current communication throughput informed by the throughput measuring unit 210. When determining the allocation of the communication throughput to each service based on the priority or the like of the service as mentioned above, the allocating unit 250 may allocation the communication throughput to each service in the communication state in the range of the communication throughput obtained by subtracting the communication throughput allocated to the service that has become to be in the non-communication from the predicted communication throughput by the throughput prediction unit.

The communication control unit 230 causes the control apparatus 24 to communicate in a range of the communication throughput allocated by the allocating unit 250. The communication control unit 230 may set the upper limit value of the inputable amount of data for each service in the range of the allocated communication throughput and inform the control apparatus 24. It should be noted that when performing the control of the communication throughput according to the priority, the communication control unit 230 may set the upper limit value based on the communication throughput of each service informed by the allocating unit 250.

The control apparatus 24 limits the transmission of the transmission data for each service according to the upper limit value of the input data amount informed by the allocating unit 250. For example, the control apparatus 24 limits the data communication volume for each service so that the amount of data transmitted to the external apparatus 30 does not exceed the upper limit value of the input data amount informed by the communication control unit 230. In this way, the communication throughput according to the priority of the data communication can be appropriately limited.

Figure 10:
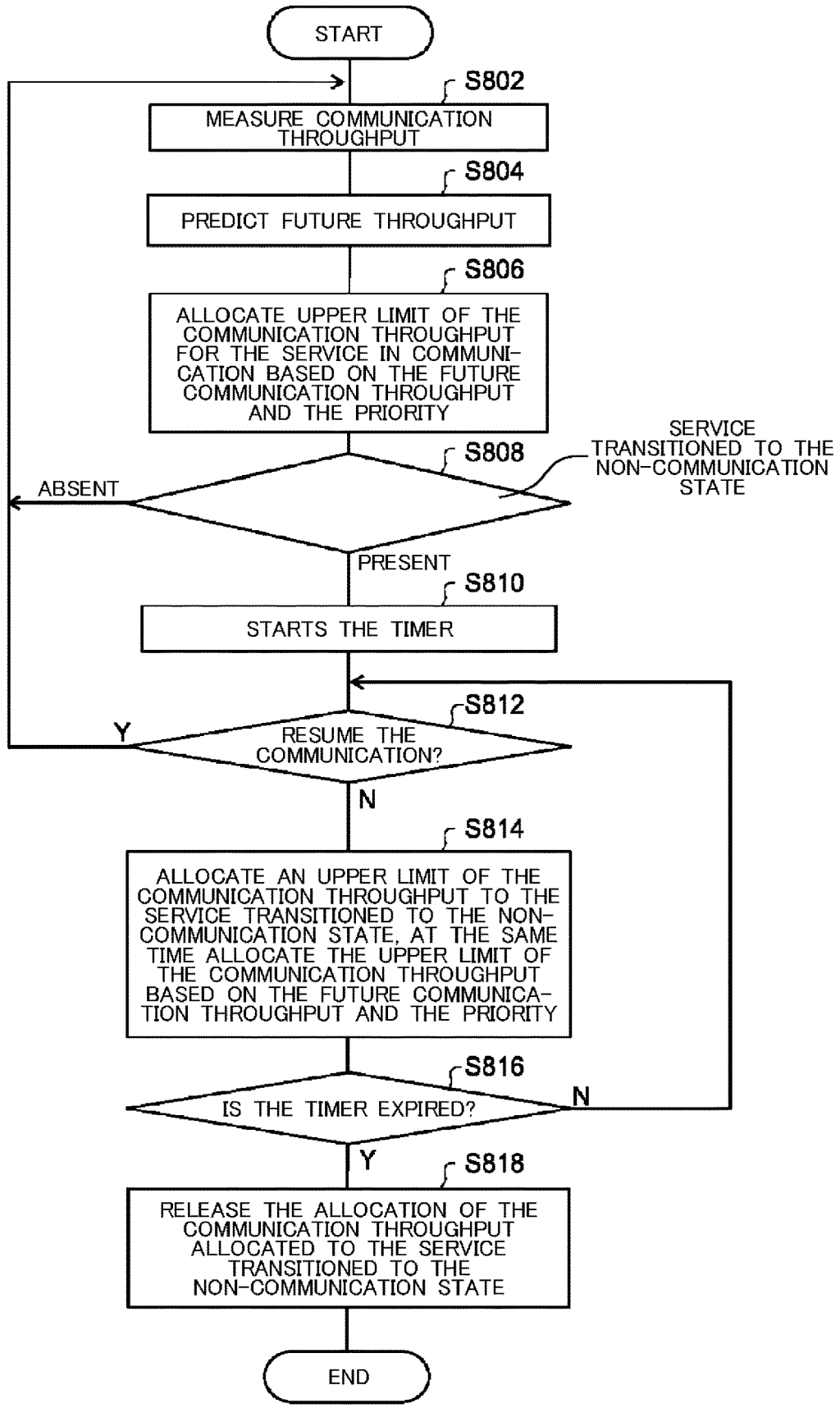
FIG. 10 illustrates a flow chart according to a process of allocating a communication throughput to a non-communication service.

FIG. 10 illustrates a flow chart according to the process for allocating the communication throughput to the non-communication service.

In S802, the throughput measuring unit 210 measures the communication throughput. In S804, the throughput prediction unit 220 predicts the future communication throughput based on the communication throughput measured by the throughput measuring unit 210. In S806, the allocating unit 250 allocates the upper limit value of the communication throughput to the service in communication based on the future communication throughput and the priority.

In S808, the allocating unit 250 determines whether there is a service transitioned from the communication state to the non-communication state based on the communication throughput measured by the throughput measuring unit 210. When the service is not transitioned to the non-communication state, the process is transitioned to S802. When there is a service transitioned to the non-communication state from the communication state, in S810, the timer starts. Specifically, the allocating unit 250 reads the time of the "allocation time of a non-communication state" corresponding to the service transitioned to the non-communication state from the service information described in relation with FIG. 4, and starts the timer that expires at the time read.

Then, in S812, the allocating unit 250 determines whether the communication related to the service transitioned to the non-communication state is resumed or not. When the communication related to the service transitioned to the non-communication state is resumed, the process is transitioned to S802. When the communication related to the service transitioned to the non-communication state is not resumed, in S814, the allocating unit 250 allocates the upper limit value of the communication throughput to the service transitioned to the non-communication state and determined in S808, and at the same time, allocates the upper limit value of the communication throughput based on the future communication throughput and the priority to the service in communication.

Specifically, the allocating unit 250 reads the "allotment" and the "allocation reduction rate" corresponding to the service transitioned to the non-communication from the service information described in relation with FIG. 4 and so on, to the service that has been determined to be transitioned to the non-communication state in S808. The allocating unit 250 allocates the communication throughput determined by the "allotment" and "allocation reduction rate" of the service information to the service transitioned from the communication state to the non-communication state. On the other hand, the allocating unit 250 allocates the upper limit value of the communication throughput based on the future communication throughput and the priority to the service holding the communication state.

It should be noted that for the service with an allocation reduction rate of the communication throughput set to be a value greater than 0, the allocating unit 250 decreases the allocated communication throughput according to the elapse of time from the timing when becoming to be in the non-communication according to the allocation reduction rate of the communication throughput while the non-communication state continues. This ensures the continuity of communication for services that are temporarily in the non-communication state, while ensuring that the state in which the majority of the available communication throughput is occupied by services in the non-communication state does not continue for a long time. For each service that holds the communication state, the allocating unit 250 allocates the communication throughput within the range of the communication throughput obtained by subtracting the communication throughput to be allocated to the service that has become to be in the non-communication state from the total value of the communication throughput of all services predicted by the throughput prediction unit 220.

In S816, the allocating unit 250 determines whether the timer started in S810 has been expired. When the timer started in S810 is not expired, the process is transitioned to S812. When the timer started in S810 is expired, the allocation of the communication throughput allocated to the service that is transitioned to the non-communication state in S814 is released (S818), and the process of the present flow chart ends. It should be noted that when the process of the present flow chart ends, the process from S802 is resumed.

As described above, with the information processing apparatus 200, the allocation of the communication throughput to the service that has become to be in the non-communication state from the communication state can be held only in a predetermined period. In this way, even when a certain service temporarily suspends the communication, since the allocation of the communication throughput to the service is held for the time being, the communication can be resumed rapidly when it is resumed. For example, by applying the allocation of the described communication throughput to the service of the control system of the vehicle 50, it is possible to resume the utilization of the service of the control system of the vehicle 50 rapidly. Also, by applying the allocation of such a communication throughput to the service related to website browsing, it is possible to not take too long to reconnect to the website. Also, by applying the allocation of such a communication throughput to the service that provides multimedia contents, it is possible to not take too long to resume the video or music.

Figure 11:
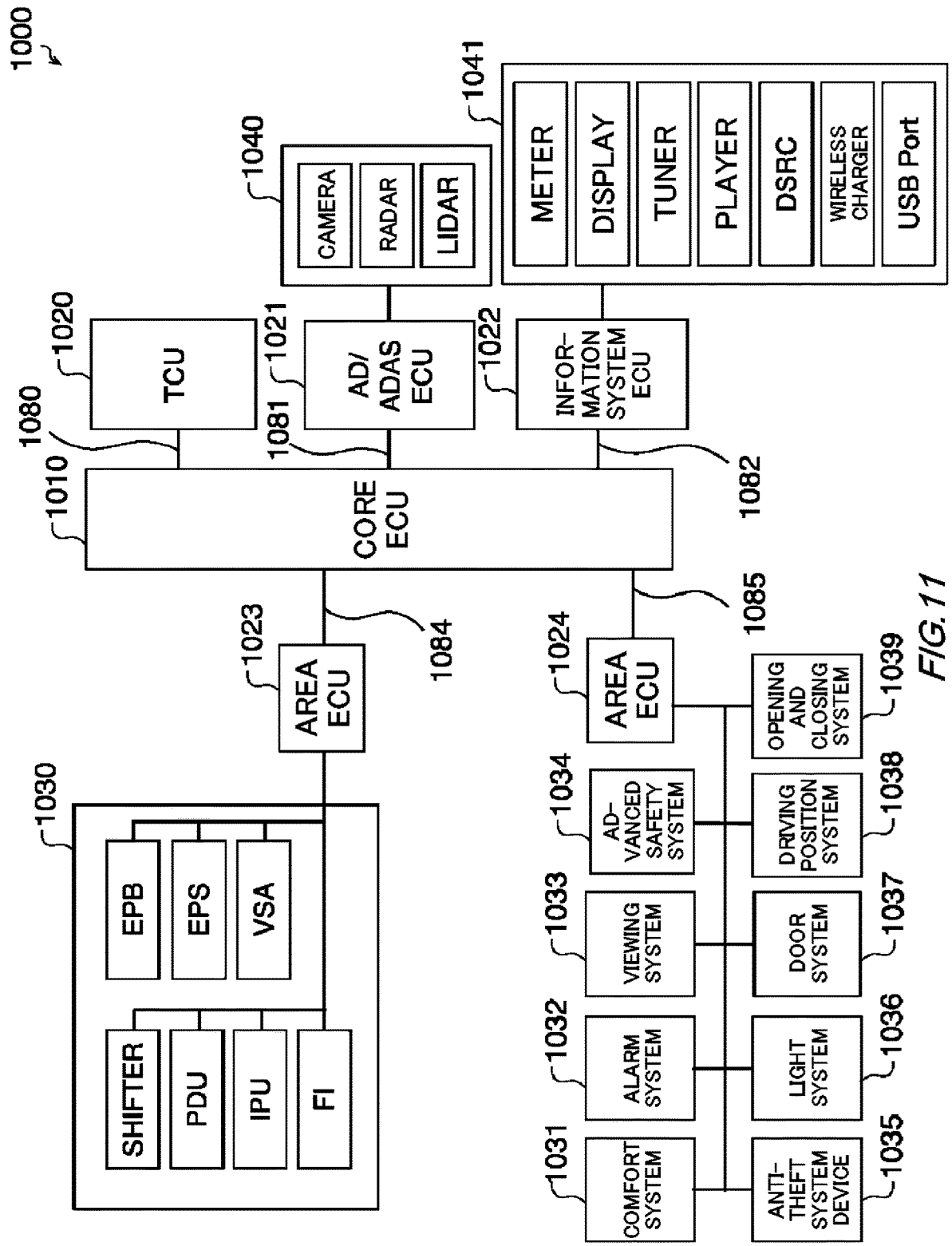
FIG. 11 illustrates an implementation of a control system of a vehicle 50.

FIG. 11 illustrates an implementation of the control system of the vehicle 50. A control system 1000 includes a core ECU 1010, a TCU 1020, an AD/ADAS ECU 1021, an information system ECU 1022, an area ECU 1023, an area ECU 1024, a sensor device 1040, an information system device 1041, a drive system device 1030, a comfort system device 1031, an alarm system device 1032, a viewing system device 1033, an advanced safety system device 1034, an anti-theft system device 1035, a light system device 1036, a door system device 1037, a driving position system device 1038, an opening and closing system device 1039, a communication network 1080, a communication network 1081, a communication network 1082, a communication network 1084, and a communication network 1085. The AD/ADAS ECU 1021 is an ECU that performs a control which relates to automated driving (AD) and advanced driver assistance systems (ADAS).

The TCU 1020 is a telematics control unit. The TCU 1020 is one implementation example of the information processing apparatus 200 described above. Note that the TCU 1020 and the core ECU 1010 may cooperate with each other to function as the information processing apparatus 200 described above. The AD/ADAS ECU 1021, the information system ECU 1022, the area ECU 1023, and the area ECU 1024 are respectively implementation examples of the control apparatus 24 described above.

The communication network 1080, the communication network 1081, the communication network 1082, the communication network 1084, and the communication network 1085 are implementation examples of the in-vehicle network 29. The communication network 1080, the communication network 1081, the communication network 1082, the communication network 1084, and the communication network 1085 may include the Ethernet network. The TCU 1020, the core ECU 1010, the AD/ADAS ECU 1021, the information system ECU 1022, the area ECU 1023, and the area ECU 1024 may be capable of IP communications via the communication network 1080, the communication network 1081, the communication network 1082, the communication network 1084, and the communication network 1085. Note that the communication network 1084 and the communication network 1085 may include the CAN.

The sensor device 1040 includes a sensor with a camera, a rater and a LIDAR. The AD/ADAS ECU 1021 is connected to each sensor included in the sensor device 1040 through a bus, controls each sensor included in the sensor device 1040, to acquire information detected by each sensor at the same time.

The information system device 1041 has a device including a meter device, a display device, a tuner, a player, a DSRC (Dedicated Short Range Communications) system, a wireless charger, and a USB port. The information system ECU 1022 is connected to each device included in the information system device 1041 through the bus, and controls each device included in the information system device 1041. The information system device 1041 includes an information communication device, a multimedia-related device, and a user interface device.

The drive system device 1030 has a device including an electronic parking brake (EPB), an electric power steering system (EPS), a vehicle behavior stabilization control system (VSA), a shifter (SHIFTER), a power drive unit (PDU), and an intelligent power unit (IPU), and a fuel injection (FI) apparatus. The drive system device 1030 is connected to each device included in the drive system device 1030 through the bus, and controls each device included in the drive system device 1030.

The area ECU 1024 is connected, through the bus, to the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039; and controls devices included in the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039. The area ECU 1024 is connected, through the bus, to the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039. The comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039 mainly include auxiliary devices of the vehicle 50.

The drive system device 1030. the sensor device 1040, the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039 are devices of the control system of the vehicle 50. The information system device 1041 is a device of a non-control system.

The data communication, which relates to the device included in the sensor device 1040, the drive system device 1030. the comfort system device 1031, the alarm system device 1032, the viewing system device 1033, the advanced safety system device 1034, the anti-theft system device 1035, the light system device 1036, the door system device 1037, the driving position system device 1038, and the opening and closing system device 1039, may have a lower priority than that of the data communication which relates to the device included in the information system device 1041.

Note that the vehicle 50 may be an example of a mobile object. An example of the mobile object includes an automobile such as a passenger vehicle and a bus, a saddle riding type vehicle, and transportation device such as an aircraft and a ship. The mobile object is not limited to transportation device but may be any mobile device. The information processing apparatus 200 may not be an apparatus loaded on a transportation device such as the vehicle 50, and may be a mobile terminal, a personal computer or the like.

As described above, with the information processing apparatus 200 and an implementation example of the information processing apparatus 200, it is possible to enhance a possibility of enabling the data communication with a high priority to continue, by limiting the data communication with a low priority. Typically, when the plurality of data communications are performed in a device loaded on a mobile object, it is required to communicate in a communication speed (also referred to as a communication band). However, it is not always possible to obtain an appropriate communication speed in all of the plurality of data communications. For example, when the communication speed is decreased due to a deterioration of a communication environment, there is a problem that the data communication with a high priority may be limited. In contrast, with the information processing apparatus 200 described above, such a problem can be alleviated.

Figure 12:
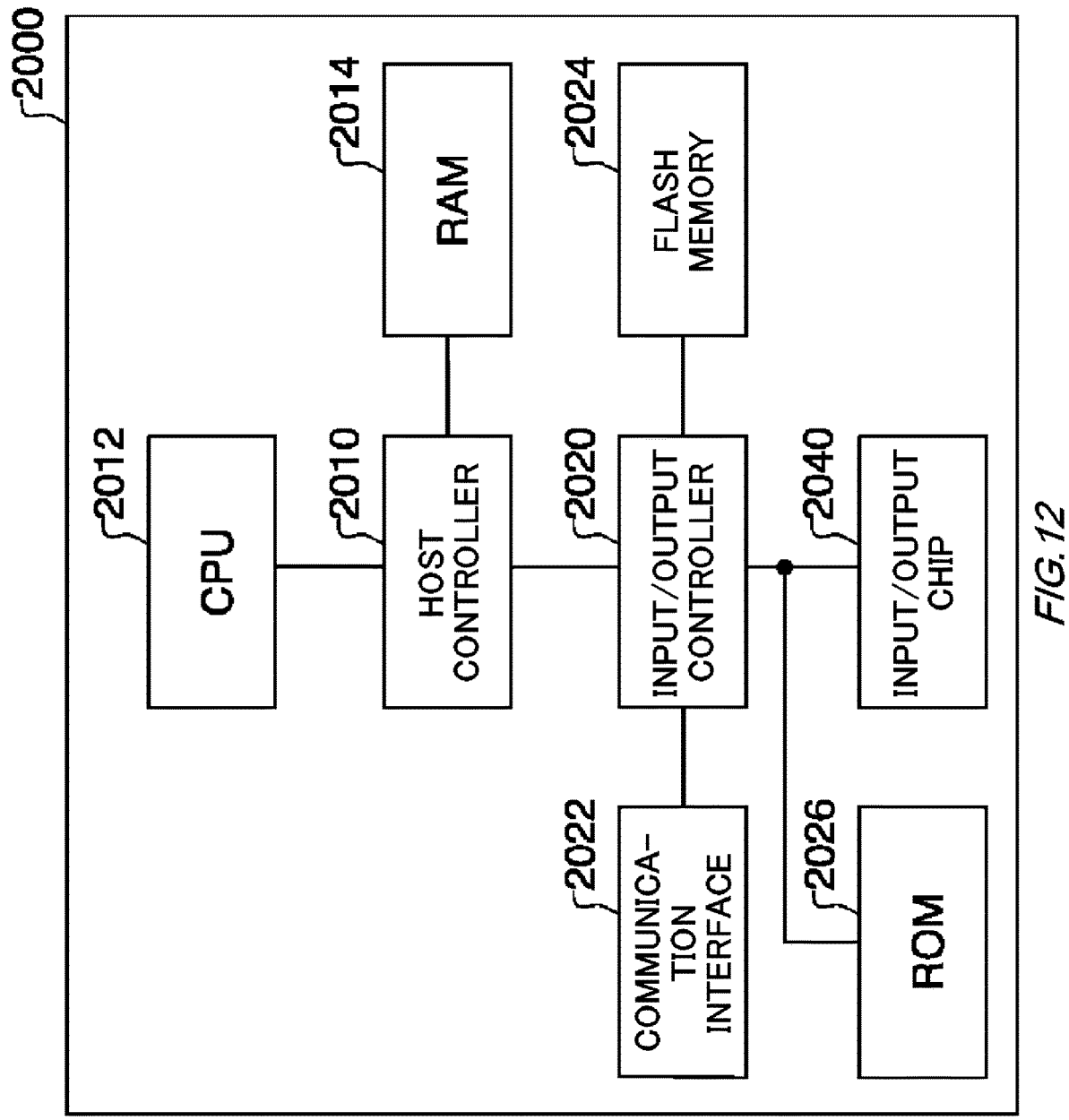
FIG. 12 illustrates an example of a computer 2000.

FIG. 12 illustrates an example of a computer 2000 in which a plurality of embodiments of the present invention may be entirely or partially embodied. A program installed on the computer 2000 can cause the computer 2000 to function as a device such as the information processing apparatus or each unit of the device according to the embodiment, or to execute an operation associated with the device or each unit of the device, and/or to execute a process or steps of the process according to the embodiment. Such a program may be executed by a CPU 2012 in order to cause the computer 2000 to execute a specific operation associated with some or all of the processing procedures and the blocks in the block diagram described herein.

The computer 2000 according to this embodiment includes the CPU 2012 and RAM 2014, which are mutually connected by a host controller 2010. The computer 2000 also includes ROM 2026, a flash memory 2024, a communication interface 2022, and an input/output chip 2040. The ROM 2026, the flash memory 2024, the communication interface 2022 and the input/output chip 2040 are connected to the host controller 2010 through an input/output controller 2020.

The CPU 2012 operates according to the programs stored in the ROM 2026 and the RAM 2014, thereby controlling each unit.

The communication interface 2022 communicates with other electronic devices through a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 through an input/output port such as a serial port, a parallel port, a keyboard port, a mouse port, a monitor port, a USB port, or an HDMI (registered trademark) port.

The programs are provided through a computer-readable storage medium, such as a CD-ROM, a DVD-ROM, or a memory card, or through a network. The RAM 2014, the ROM 2026, or the flash memory 2024 is an example of the computer-readable storage medium. The programs are installed in the flash memory 2024, the RAM 2014 or the ROM 2026, and are executed by the CPU 2012. Information processing described in those programs is read by the computer 2000, and provides cooperation between the programs and the various types of hardware resources described above. A device or a method may be configured by implementing the operation or process of the information according to the use of the computer 2000.

For example, in a case where communication is performed between the computer 2000 and an external device, the CPU 2012 may execute a communication program loaded in the RAM 2014, and instruct the communication interface 2022 to execute communication processing, based on processing described in the communication program. The communication interface 2022, under control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Moreover, the CPU 2012 may cause all or a necessary portion of a file or a database stored in the recording medium such as the flash memory 2024 or the like, to be read by the RAM 2014, and may execute various types of processing on the data on the RAM 2014. Then, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described herein and specified by instruction sequences of the programs, and writes back the results into the RAM 2014. Moreover, the CPU 2012 may retrieve information in a file, a database, or the like in the recording medium. For example, in a case where a plurality of entries, each having an attribute value of a first attribute associated with an attribute value of a second attribute, are stored in the recording medium, the CPU 2012 may retrieve, out of the plurality of entries, an entry with the attribute value of the first attribute specified that meets a condition, read the attribute value of the second attribute stored in said entry, and thereby obtain the attribute value of the second attribute associated with the first attribute meeting a predetermined condition.

The program or software module described above may be stored on the computer 2000 or in a computer-readable storage medium near the computer 2000. A recording medium such as a hard disk or RAM provided in a server system connected to a dedicated communication network or the Internet can be used as the computer-readable storage medium. The programs stored in the computer-readable storage medium may be provided to the computer 2000 through the network.

A program, which is installed on the computer 2000 and causes the computer 2000 to function as the information processing apparatus 200, may work on the CPU 2012 or the like to cause the computer 2000 to function as each unit of the information processing apparatus 200. Information processing written in these programs functions as each unit of the information processing apparatus 200 that is specific means by which software and the above-described various hardware resources cooperate by being read by the computer 2000. Then, by the specific means realizing calculation or processing of information according to a purpose of use of the computer 2000 in the present embodiment, the unique information processing apparatus 200 according to the purpose of use is constructed.

Various embodiments have been described with reference to the block diagram or the like. Blocks in the block diagrams may respectively represent (1) steps of processes in which operations are performed or (2) "units" of apparatuses responsible for performing operations. Specific steps and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable storage medium may include any tangible device capable of storing an instruction executed by an appropriate device. As a result, the computer-readable storage medium having the instruction stored thereon constitutes at least a part of a product including an instruction that may be executed in order to provide a means to execute an operation specified by a processing procedure or a block diagram. Examples of the computer-readable storage media may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

The computer-readable instruction may be provided to a general-purpose computer, a special-purpose computer, or a processor or a programmable circuit of another programmable data processing apparatus, locally or through a local area network (LAN), a wide area network (WAN) such as the Internet or the like, and the computer-readable instruction may be executed in order to provide a means to execute operations specified by the described processing procedure or the block diagram. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

24: control apparatus; 25: device; 29: in-vehicle network; 30: external apparatus; 50: vehicle; 90: communication network; 92: wireless communication system; 200: information processing apparatus; 202: communication unit; 210: throughput measuring unit; 220: throughput prediction unit; 230: communication control unit; 240: communication determination unit; 250: allocating unit; 260: quality calculation unit; 280: proxy processing unit; 1010: core ECU; 1020: TCU; 1021: AD/ADAS ECU; 1022: information system ECU; 1023: area ECU; 1024: area ECU; 1030: drive system device; 1031: comfort system device; 1032: alarm system device; 1033: viewing system device; 1034: advanced safety system device; 1035: anti-theft system device; 1036: light system device; 1037: door system device; 1038: driving position system device; 1039: opening and closing system device; 1040: sensor device; 1041: information system device; 1080: communication network; 1081: communication network; 1082: communication network; 1084: communication network; 1085: communication network; 2000: computer; 2010: host controller; 2012: CPU; 2014: RAM; 2020: input/output controller; 2022: communication interface; 2024: flash memory; 2026: ROM; 2040: input/output chip

What is claimed is:

1. An information processing apparatus for performing a wireless communication with an external apparatus,
    wherein the information processing apparatus comprises a processor, configured to
    measure a communication throughput with the external apparatus;
    predict a future communication throughput using at least data of the communication throughput that has been measured; and
    allocate a usable communication throughput for each service in a communication state based on the communication throughput that has been predicted, wherein the processor is configured to, when a communication of a first service has become in a non-communication state from a communication state, allocate the usable communication throughput to the first service during a predetermined period after the communication of the first service has become to be in the non-communication state; and
    wherein the information processing apparatus is configured to
    when the communication of the first service has become in a non-communication state from a communication state, hold an allocation of a communication throughput that has been allocated when the first service was in the communication state during a predetermined period after the communication of the first service has become in the non-communication state; and
    when a communication of a second service, whose type is different from the first service, has become in a non-communication state from a communication state, allocate a communication throughput that is lower than a communication throughput allocated when the second service is in the communication state, during a predetermined period after the communication of the second service has become to be in the non-communication state.

2. The information processing apparatus according to claim 1, wherein
    the processor is configured to
    when the communication of the first service has become in a non-communication state from a communication state, allocate a predetermined first communication throughput during a predetermined period after the communication of the first service has become in the non- communication state; and
    when a communication of a second service, whose type is different from the first service, has become in a non-communication state from a communication state, allocate a second communication throughput lower than the first communication throughput, during a predetermined period after the communication of the second service has become in the non- communication state.

3. The information processing apparatus according to claim 1, wherein
the processor is configured to
when the communication of the first service has become to be in a non-communication state from a communication state, allocate a usable communication throughput to the first service during a predetermined first period after the communication of the first service has become in the non-communication state; and
when a communication of a second service, whose type is different from the first service, has become in a non-communication state from a communication state, allocate a usable communication throughput to the first service, during a predetermined second period shorter than the first period after the communication of the second service has become in the non-communication state.

4. The information processing apparatus according to claim 1, wherein the information processing apparatus is provided in a vehicle; and the first service includes a service related to a control of the vehicle.

5. The information processing apparatus according to claim 1, wherein the first service is at least one of a service related to web browsing and a service related to a multimedia.

6. The information processing apparatus according to claim 1, wherein the processor is configured to, when the communication of the first service has become in a non-communication state from a communication state, decrease a usable communication throughput allocated to the first service according to an elapse of time after the communication of the first service has become in the non-communication state.

7. The information processing apparatus according to claim 2, wherein
the processor is configured to
when the communication of the first service has become in a non-communication state from a communication state, allocate a usable communication throughput to the first service during a predetermined first period after the communication of the first service has become in the non-communication state; and
when a communication of a second service, whose type is different from the first service, has become in a non-communication state from a communication state, allocate a usable communication throughput to the first service, during a predetermined second period shorter than the first period after the communication of the second service has become in the non-communication state.

8. The information processing apparatus according to claim 2, wherein the information processing apparatus is provided in a vehicle; and the first service includes a service related to control of the vehicle.

9. The information processing apparatus according to claim 3, wherein the information processing apparatus is provided in a vehicle; and the first service includes a service related to control of the vehicle.

10. The information processing apparatus according to claim 2, wherein the first service is at least one of a service related to web browsing and a service related to a multimedia.

11. The information processing apparatus according to claim 3, wherein the first service is at least one of a service related to web browsing and a service related to a multimedia.

12. The information processing apparatus according to claim 2, wherein the processor is configured to, when the communication of the first service has become in a non-communication state from a communication state, decrease a usable communication throughput allocated to the first service according to an elapse of time after the communication of the first service has become in the non-communication state.

13. The information processing apparatus according to claim 3, wherein the processor is configured to, when the communication of the first service has become in a non-communication state from a communication state, decrease a usable communication throughput allocated to the first service according to an elapse of time after the communication of the first service has become in the non-communication state.

14. A vehicle comprising the information processing apparatus according to claim 1.

15. An information processing method executed by an information processing apparatus for performing a wireless communication with an external apparatus, comprising
measuring a communication throughput with the external apparatus;
predicting a future communication throughput using at least data of the communication throughput that has been measured; and
allocating a usable communication throughput for each service in a communication state based on the communication throughput that has been predicted,
allocating, when a communication of a first service has become in a non- communication state from a communication state, the usable communication throughput to the first service during a predetermined period after the communication of the first service has become in the non-communication state; and
wherein the information processing apparatus is configured to
when the communication of the first service has become in a non-communication state from a communication state, hold an allocation of a communication throughput that has been allocated when the first service was in the communication state during a predetermined period after the communication of the first service has become in the non-communication state; and
when a communication of a second service, whose type is different from the first service, has become in a non-communication state from a communication state, allocate a communication throughput that is lower than a communication throughput allocated when the second service is in the communication state, during a predetermined period after the communication of the second service has become to be in the non-communication state.

16. A non-transitory computer-readable storage medium having recorded thereon a program that, when executed by a computer for performing wireless communication with an external apparatus, causes the computer to perform operations comprising:
measuring a communication throughput with the external apparatus;
predicting a future communication throughput using at least data of the communication throughput that has been measured; and allocating a usable communication throughput for each service in a communication state based on the communication throughput that has been predicted, allocating, when a communication of a first service has become in a non- communication state from a communication state, the usable communication throughput to the first service during a predetermined period after the communication of the first service has become in the non-communication state; and is configured to when the communication of the first service has become in a non-communication state from a communication state, hold an allocation of a communication throughput that has been allocated when the first service was in the communication state during a predetermined period after the communication of the first service has become in the non-communication state; and when a communication of a second service, whose type is different from the first service, has become in a non-communication state from a communication state, allocate a communication throughput that is lower than a communication throughput allocated when the second service is in the communication state, during a predetermined period after the communication of the second service has become to be in the non-communication state.

* * * * *